US007962665B2

(12) United States Patent
Eide et al.

(10) Patent No.: US 7,962,665 B2
(45) Date of Patent: Jun. 14, 2011

(54) MANAGING CONDITION INDICATORS THAT USE THE SAME PHYSICAL INDICATOR DEVICE IN A LOGICALLY PARTITIONED COMPUTER SYSTEM

(75) Inventors: Curtis Shannon Eide, Rochester, MN (US); Aditya Kumar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 12/238,776

(22) Filed: Sep. 26, 2008

(65) Prior Publication Data

US 2010/0079302 A1   Apr. 1, 2010

(51) Int. Cl.
*G06F 3/00* (2006.01)
*G06F 9/00* (2006.01)
(52) U.S. Cl. .............................................. 710/15; 713/2
(58) Field of Classification Search ................. 710/15; 713/2

See application file for complete search history.

(56) References Cited

U.S. PATENT DOCUMENTS 7,076,570 B2 * 7/2006 Ahrens et al. ..................... 710/6
7,756,947 B2 * 7/2010 Yang ............................. 709/217

* cited by examiner

*Primary Examiner* — Henry W Tsai
*Assistant Examiner* — Juanito C Borromeo
(74) *Attorney, Agent, or Firm* — Roy W. Truelson

(57) ABSTRACT

A computer system independently maintains states of multiple condition indicators as logical state data, each indicator for a different respective condition and having at least an active and inactive state. Multiple condition indicators share a single human-perceptible physical indicator having at least (N+1) states, where N is the number of condition indicators, the physical indicator states including a state for all conditions inactive, and a respective separate state for each respective condition active. Preferably, the conditions comprise a fault condition and an identify condition, and the physical indicator is a light which is off if neither condition is active, is constant on if the fault condition is active, and is flashing if the identify condition is active.

16 Claims, 9 Drawing Sheets

|  | Virtual Indicators | | | | Real | Physical |
|---|---|---|---|---|---|---|
|  | P1 | P3 | P4 | SAC | Ind's | Indicators |
| Comp1 | | | | | | |
| Comp2 | | | | | | |
| Comp3 | | | | | | |
| ⋮ | | | | | | |
| | | | | | | 321 |
| Comp(N+1)-ID | +/- | +/- | +/- | +/- | +/- | I/F/- |
| -Flt | +/- | +/- | +/- | +/- | +/- | |
| Comp(N+2)-ID | +/- | +/- | +/- | +/- | +/- | I/F/- |
| -Flt | +/- | +/- | +/- | +/- | +/- | |
| Comp(N+3)-ID | +/- | +/- | +/- | +/- | +/- | I/F/- |
| -Flt | +/- | +/- | +/- | +/- | +/- | |
| ⋮ | | | | | | |
| Card1 - Ind | +/- | +/- | +/- | +/- | +/- | I/F/- |
| - Flt | +/- | +/- | +/- | +/- | +/- | |
| Card2 - Ind | +/- | +/- | +/- | +/- | +/- | I/F/- |
| - Flt | +/- | +/- | +/- | +/- | +/- | |
| Card3 - Ind | +/- | +/- | +/- | +/- | +/- | I/F/- |
| - Flt | +/- | +/- | +/- | +/- | +/- | |
| ⋮ | | | | | | |
| Drawer1-ID | +/- | +/- | +/- | +/- | +/- | I/F/- |
| -Flt | +/- | +/- | +/- | +/- | +/- | |
| Drawer2-ID | +/- | +/- | +/- | +/- | +/- | I/F/- |
| -Flt | +/- | +/- | +/- | +/- | +/- | |
| ⋮ | | | | | | |
| Rack1-ID | | | | | +/- | I/F/- |
| -Flt | | | | | +/- | |
| Rack2-ID | | | | | +/- | I/F/- |
| -Flt | | | | | +/- | |
| ⋮ | | | | | | |
| Row1-ID | | | | | +/- | I/F/- |
| -Flt | | | | | +/- | |
| Row2-ID | | | | | +/- | I/F/- |
| -Flt | | | | | +/- | |
| | | | | | Derived | |

FIG. 6

MANAGING CONDITION INDICATORS THAT USE THE SAME PHYSICAL INDICATOR DEVICE IN A LOGICALLY PARTITIONED COMPUTER SYSTEM

CROSS REFERENCE TO RELATED APPLICATION

The present invention application is related to U.S. patent application Ser. No. 12/238,757, filed on the same date as the present application, entitled "Controlling Access to Physical Indicators in a Logically Partitioned Computer System", which is herein incorporated by reference.

FIELD OF THE INVENTION

The present invention relates to digital data processing, and in particular to the use of indicator lights for identifying different physical components of a digital data processing system.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems. Typically, the system comprises one or more central processing units (CPUs) which form the heart of the system, and which execute instructions contained in computer programs stored in memory. The system further includes data storage devices, such as rotating disk drives, and hardware necessary to communicate with the outside world, such as input/output controllers; I/O devices attached thereto such as keyboards, monitors, printers, and so forth; and external communication devices for communicating with other digital systems.

For many reasons, computer systems are usually physically constructed of multiple modular components, each having some pre-defined interface to one or more other components. From the standpoint of the system, a modular component may be viewed as a "black box" which conforms to the pre-defined interface. Any component, regardless of internal structure, which conforms to the same pre-defined interface can be substituted for an existing component in the design of the computer system. This approach enables considerable flexibility in the design and configuration of computer systems. It is possible to improve the design of a computer system by improving the internal design of a modular component (while conforming to the same interface), without affecting other components of the system. This modularization occurs at various levels of generality, from modularized design of individual logic gates on a semiconductor circuit chip, to functional components of the chip, to the chip itself, to larger assemblies made of multiple chips and other components.

At some level of modularity, a component may be designed to be physically replaceable with an equivalent component after manufacture of the computer system. I.e., the component will be coupled to other components in the system using electrical connectors, clips, threaded fasteners, and the like, which are designed for coupling and uncoupling after manufacture. Such physically replaceable components are referred to as "field replaceable units" (FRUs). A finished electronic circuit board assembly, complete with all components soldered in place, is often designed as such a FRU, while an integrated circuit chip typically is not. The use of such field replaceable units facilitates the replacement of a defective component with a new component of identical type after system manufacture. It also facilitates the re-configuration or upgrade of an existing physical computer system by substituting a newer or enhanced version of a FRU for the existing unit. Additionally, a computer system may be constructed with unused couplings, which provide support for later upgrading the computer system by attaching additional FRUs to the unused couplings. The use of multiple types of FRUs attached to generic couplings enables a basic computer system design to be configured in any one of a very large number of configuration permutations.

A complex computer system may contain a large number of FRUs and a large number of couplings for circuit cards, cables, or the like, which are often difficult to visually distinguish. For example, electronic logic circuitry is typically contained in multiple circuit card assemblies (which may be a type of FRU), which are plugged into some form of card frame assembly (which may be another type of FRU), which in turn may be housed in larger racks or similar units (which may be still another type of FRU). Physically, the racks look pretty much alike, the card frame assemblies look pretty much alike, many of the cards may look alike, and communications ports on cards may look alike. A trained eye can generally tell the difference between a processor card (i.e., a card mounting one or more processor units) and a memory card (a card mounting banks of memory modules), but all processor cards may look alike and all memory cards may look alike. There may, in fact, be no physical difference whatsoever between two units, the only difference being logical assignments (such as addresses or identifiers) made by the computer system to distinguish one unit from another and/or unique identifier markings, such as part numbers and serial numbers.

For maintenance and other purposes, it is often desirable to know which physical unit (such as a FRU or a communications port coupling which is embedded in, and a portion of, a FRU) corresponds to a logical designation made by the computer system. For example, the internal diagnostics of a computer system may detect a defect in a communications path with an external device. This communications path may have a physical I/O adapter card, communications port coupling, and communications cable associated with it. In order to diagnose and correct the problem, it may be necessary to identify these physical components for test and/or replacement. If, as is often the case, there are a large number of cards, port couplings and cables, it can be difficult to determine which physical components correspond to the logical designation of the computer system. It will be understood that test or replacement of a unit is only one example of a situation in which it is desirable to identify the unit, there being many other such circumstances which do not involve test/replacement of the unit.

One technique for assisting the service person in this instance is to provide switchable indicator lights on the various units. Indicator lights often correspond to physical FRU's, but may be used for other physical components, such as communications ports. The lights are activated under control of the computer system itself, and may be activated automatically in response to detection of a condition such as a fault, or may be activated in response to a user command. For example, if a person wishes to know the physical location of a particular unit, he can command the computer to light up the indicator light of the unit corresponding to some logical designator. The system responds by switching on the indicator light, showing the person the corresponding physical unit.

Another recent development in the management of complex computer system resources is the logical partitioning of system resources. Conceptually, logical partitioning means that multiple discrete partitions are established, and the system resources of certain types are assigned to respective partitions. For example, processor resources of a multi-processor system may be partitioned by assigning different processors to different partitions, by sharing processors among some partitions and not others, by specifying the amount of processing resource measure available to each partition which is sharing a set of processors, and so forth. Tasks executing within a logical partition can use only the resources assigned to that partition, and not resources assigned to other partitions.

Where a logically partitioned computer system utilizes lighted indicators for assisting maintenance personnel, it is often desirable to permit some tasks running in each partition to light up the indicator lights applicable to hardware used by that partition. Since multiple logical partitions may actually share the same physical hardware unit, tasks running in multiple different partitions require the ability to light up the same indicator light.

The ability of different partitions to access the same indicator light could create a security exposure, in that a covert communications channel between partitions is created through the indicator light. U.S. Pat. No. 7,076,570, issued Jul. 11, 2006, to Ahrens et al., discloses a system of virtual indicators available to each partition. A partition may access, i.e., set and read, its own virtual indicators, but has no direct access to a physical indicator light which is shared by multiple partitions. A separate facility sets the state of the physical indicator as a function of the states of multiple virtual indicators associated with it.

With increasing complexity of logically partitioned systems and increasing expectations regarding the capabilities of such systems, there exists a need, not necessarily recognized in the art, for improved techniques to manage physical indicators in a logically partitioned system.

SUMMARY

A computer system independently maintains states of multiple condition indicators, each condition indicator being used to indicate a different respective condition associated with a respective hardware component of the computer system and having at least an active and inactive state. A condition indicator is logical state data in the computer system, and not a state of a physical indicator directly perceived by a user. Multiple condition indicators associated with a common hardware component share a single physical indicator associated with that hardware component, the state of the physical indicator being derived from the states of the multiple condition indicators. The physical indicator has at least (N+1) states, where N is the number of condition indicators, the physical indicator states including a state for all conditions inactive, and a respective separate state for each respective condition active.

In the preferred embodiment, the conditions comprise a fault condition and an identify condition. The physical indicator is a light which is off if neither condition is active, is constant on if the fault condition is active, and is flashing if the identify condition is active. If both fault and identify conditions are active, the identify takes priority and the light is flashing. However, it will be understood that different forms of indicating state with the physical indicator could be used, that it would be possible to support a greater number of physical indicator states, and that the physical indicator could be something other than a light.

In the preferred embodiment, the computer system is logically partitioned into multiple logical partitions. A process running within a partition accesses multiple partition-specific virtual indicators, each corresponding to a respective one of the conditions. A composite indicator for a condition, herein referred to as a real indicator, is derived as an OR function of the corresponding virtual indicators of different partitions. The use of virtual indicators is described in U.S. Pat. No. 7,076,570, issued Jul. 11, 2006, to Ahrens et al., herein incorporated by reference. The state of a physical indicator is derived from the states of multiple real indicators. However, it will be understood that the present invention is not necessarily limited to logically partitioned systems or to systems which use virtual indicators as described herein.

The use of multiple logical condition indicators which share a single physical indicator in accordance with the preferred embodiment provides a flexible and extensible system for using available physical indicators without requiring a proliferation of physical indicator devices.

The details of the present invention, both as to its structure and operation, can best be understood in reference to the accompanying drawings, in which like reference numerals refer to like parts, and in which:

BRIEF DESCRIPTION OF THE SEVERAL VIEWS OF THE DRAWING

FIG. 6 is a simplified conceptual representation of virtual, real and physical indicator states managed by the hypervisor, according to the preferred embodiment.

DETAILED DESCRIPTION

Logical Partitioning Overview

Figure 1:
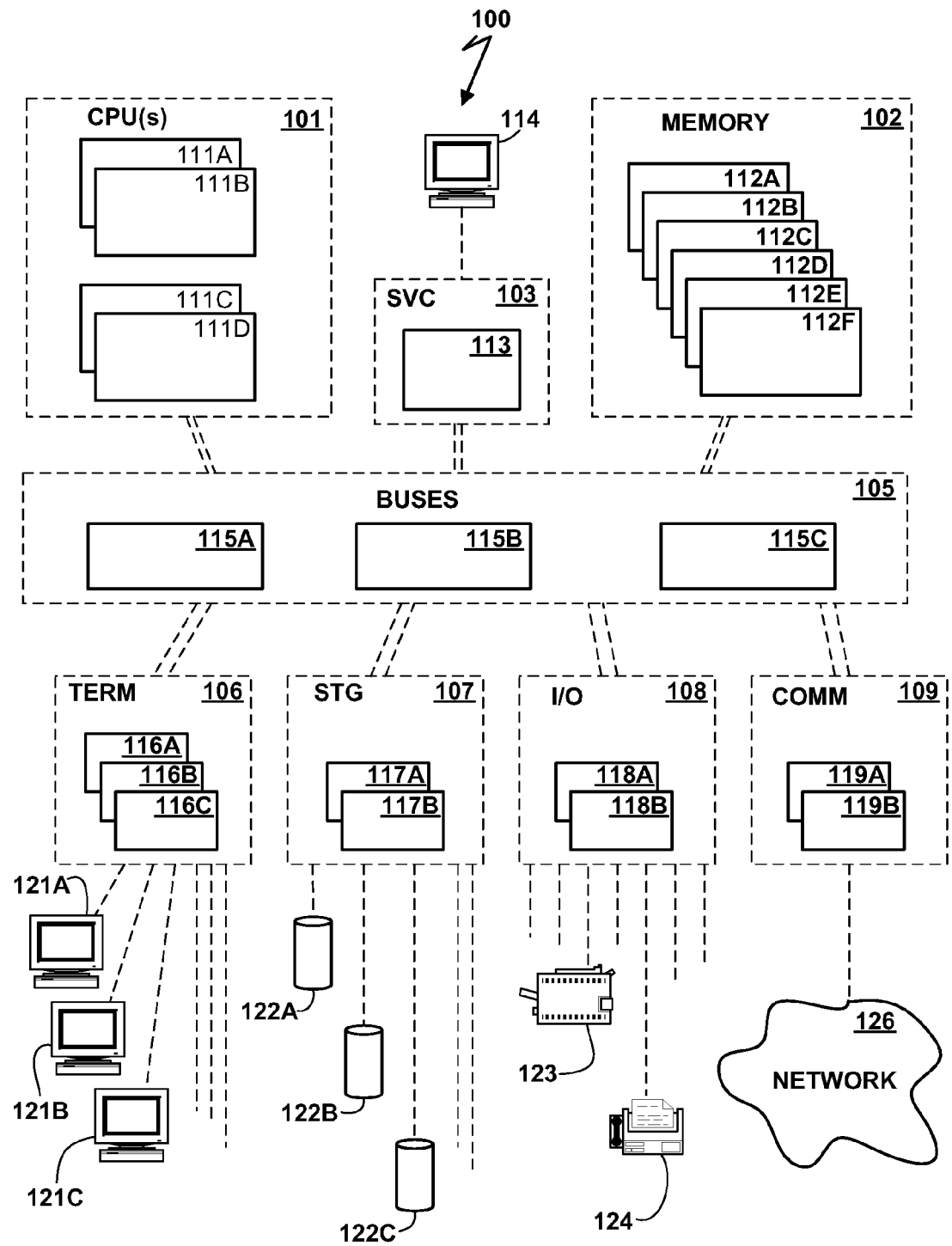
FIG. 1 is a high-level block diagram of the major hardware components of a logically partitionable computer system having multiple physical hardware components, according to the preferred embodiment of the present invention.

Logical partitioning is a technique for dividing a single large computer system into multiple partitions, each of which behaves in some respects as a separate computer system. Computer system resources may be allocated in any of various ways for use by the partitions. A given resource may be allocated for exclusive use by a single particular partition, or may be shared among all partitions (or some subgroup of partitions) on a time interleaved or other basis. Some resources may be allocated to respective particular partitions, while others are shared. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources or share of resources assigned to that partition, and not resources assigned to other partitions.

Logical partitioning is indeed logical rather than physical. A general purpose computer typically has physical data connections such as buses running among different hardware components, allowing them to communicate with one another. These hardware resources may be shared by and/or allocated to different partitions. From a physical configuration standpoint, there is typically no distinction made with regard to logical partitions. Generally, logical partitioning is enforced by a partition manager embodied as low-level encoded executable instructions and data, although there may be a certain amount of hardware support for logical partitioning, such as special hardware registers which hold state information. The system's physical devices and subcomponents thereof are typically physically connected to allow communication without regard to logical partitions, and from this hardware standpoint, there is nothing which prevents a task executing in partition A from writing to memory or an I/O device allocated to partition B. The low level code function and/or hardware prevent access to the resources allocated to other partitions.

Code enforcement of logical partitioning constraints generally means that it is possible to alter the logical configuration of a logically partitioned computer system, i.e., to change the number of logical partitions or re-assign resources to different partitions, without reconfiguring hardware. Generally, some portion of the logical partition manager comprises a user interface for managing the low-level code function that enforces logical partitioning. This logical partition manager interface is intended for use by a single or a small group of authorized users, who are herein designated the system administrator. In the preferred embodiment described herein, this low-level logical partitioning code is referred to as the "hypervisor", and a partition manager interface is referred to as the "hardware management console".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each logical partition can be executing a different operating system or environment. Finally, isolation of tasks and resources makes it more difficult for a process executing in one partition to access resources in another partition, thus providing greater security and data integrity.

Additional background information regarding logical partitioning can be found in the following commonly owned patents and patent applications, which are herein incorporated by reference: Ser. No. 11/191,402, filed Jul. 28, 2005, entitled Method and Apparatus for Maintaining Cached State Data for One or More Shared Devices in a Logically Partitioned Computer System; Ser. No. 10/977,800, filed Oct. 29, 2004, entitled System for Managing Logical Partition Preemption; Ser. No. 10/857,744, filed May 28, 2004, entitled System for Correct Distribution of Hypervisor Work; Ser. No. 10/624,808, filed Jul. 22, 2003, entitled Apparatus and Method for Autonomously Suspending and Resuming Logical Partitions when I/O Reconfiguration is Required; Ser. No. 10/624,352, filed Jul. 22, 2003, entitled Apparatus and Method for Autonomously Detecting Resources in a Logically Partitioned Computer System; U.S. Pat. No. 7,076,570 to Ahrens et al., entitled Method and Apparatus for Managing Service Indicator Lights in a Logically Partitioned Computer System; U.S. Pat. No. 7,028,157 to Block et al., entitled On-Demand Allocation of Data Structures to Partitions; U.S. Pat. No. 7,139,855 to Armstrong et al., entitled High Performance Synchronization of Resource Allocation in a Logically-Partitioned Computer System; Ser. No. 10/422,425, filed Apr. 24, 2003, entitled Selective Generation of an Asynchronous Notification for a Partition Management Operation in a Logically-Partitioned Computer; U.S. Pat. No. 7,076,634 to Lambeth et al., entitled Address Translation Manager and Method for a Logically Partitioned Computer System; Ser. No. 10/422,190, filed Apr. 24, 2003, entitled Grouping Resource Allocation Commands in a Logically-Partitioned System; U.S. Pat. No. 7,133,994 to Abbey, entitled Configuration Size Determination in a Logically Partitioned Environment; U.S. Pat. No. 7,155,629 to Lange-Pearson et al., entitled Virtual Real Time Clock Maintenance in a Logically Partitioned Computer System; U.S. Pat. No. 6,957,435 to Armstrong et al., entitled Method and Apparatus for Allocating Processor Resources in a Logically Partitioned Computer System; U.S. Pat. No. 6,766,398 to Holm et al., entitled A Method for Processing PCI Interrupt Signals in a Logically Partitioned Guest Operating System; U.S. Pat. No. 6,820,164 to Holm et al., entitled A Method for PCI Bus Detection in a Logically Partitioned System; U.S. Pat. No. 6,662,242 to Holm et al., entitled Method for PCI I/O Using PCI Device Memory Mapping in a Logically Partitioned System; U.S. Pat. No. 6,912,493 to Scheel et al., entitled Technique for Configuring Processors in System With Logical Partitions; U.S. Pat. No. 6,438,671 to Doing et al., entitled Generating Partition Corresponding Real Address in Partitioned Mode Supporting System; U.S. Pat. No. 6,467,007 to Armstrong et al., entitled Processor Reset Generated Via Memory Access Interrupt; U.S. Pat. No. 6,681,240 to Armstrong et al, entitled Apparatus and Method for Specifying Maximum Interactive Performance in a Logical Partition of a Computer; U.S. Pat. No. 6,959,291 to Armstrong et al, entitled Management of a Concurrent Use License in a Logically Partitioned Computer; U.S. Pat. No. 6,691,146 to Armstrong et al., entitled Logical Partition Manager and Method; U.S. Pat. No. 6,279,046 to Armstrong et al., entitled Event-Driven Communications Interface for a Logically-Partitioned Computer; U.S. Pat. No. 5,659,786 to George et al., entitled System and Method for Dynamically Performing Resource Reconfiguration in a Logically Partitioned Data Processing System; and U.S. Pat. No. 4,843,541 to Bean et al., entitled Logical Resource Partitioning of a Data Processing System. The latter two patents describe implementations using the IBM S/360, S/370, S/390 and related architectures, while the remaining patents and applications describe implementations using the IBM i/Series™, AS/400™, and related architectures or variants thereof, it being understood that other system architectures could be used.

Description

Referring to the Drawing, wherein like numbers denote like parts throughout the several views, FIG. 1 is a high-level representation of the major hardware components of a logically partitionable computer system 100 having multiple physical hardware components, according to the preferred embodiment of the present invention. At a functional level, the major components of system 100 are shown in FIG. 1 outlined in dashed lines; these components include one or more central processing units (CPU) 101, main memory 102, service processor 103, terminal interface 106, storage interface 107, other I/O device interface 108, and communications/network interfaces 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Typically, a logically partitioned system will contain multiple CPUs. Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Service processor 103 is a special-purpose functional unit used for initializing the system, maintenance, and other low-level functions. In general, it does not execute user application programs, as does CPU 101. In the preferred embodiment, among other functions, service processor 103 and attached hardware management console (HMC) 114 provide an interface for a system administrator or similar individual, allowing that person to manage logical partitioning of system 100. However, the interface to logical partitioning control (the "hypervisor") could be performed by other system components, and system 100 need not necessarily have a dedicated service processor and hardware management console.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which are preferably rotating magnetic hard disk drive units, although other types of data storage device could be used. I/O and other device interface 108 provides an interface to any of various other input/output devices or devices of other types. Two such devices, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical buses, parallel and redundant paths, etc., and that separate buses may exist for communicating certain information, such as addresses or status information. In the preferred embodiment, in addition to various high-speed data buses used for communication of data as part of normal data processing operations, a special service bus using an I2C protocol connects the various hardware units, allowing the service processor or other low-level processes to perform various functions independently of the high-speed data buses, such as powering on and off, reading hardware unit identifying data, and so forth. In particular, this service bus is used for switching indicator lights in the preferred embodiment. However, such a service bus is not necessarily required.

Physically, the major functional units are typically constructed from one or more field replaceable units. Often, such a field replaceable unit is an electronic circuit card assembly. However, a physical unit need not be an electronic circuit card assembly. It could alternatively be a component such as a disk drive storage device 122, a terminal 121, a power supply, and so forth. Additionally, a single physical unit may have one or more FRUs within itself. For larger systems, a single major functional component, such as CPU 101 or memory 102, will often comprise multiple field replaceable units in the form of electronic circuit card assemblies, although it is alternatively possible for more than one major functional component to reside in a single FRU. In FIG. 1, CPU 101 is represented as containing four circuit cards (FRUs) 111A-D, each of which may contain one or more processors; memory 102 is represented as containing six cards 112A-112F, service processor 103 as containing a single card 113, buses 105 as containing three cards 115A-C, terminal interface 106 as containing three cards 116A-116C, storage interface 107 as containing two cards 117A-B, I/O and other interface 108 as containing two cards 118A-B, and communications interface 109 as containing two cards 119A-B.

It should be understood that FIG. 1 is intended to depict the representative major components of an exemplary system 100 at a high level, that individual components may have greater complexity than represented FIG. 1, and that the number, type and configuration of such functional units and physical units may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients).

In the preferred embodiment, physical indicators are associated with a hierarchy of physical hardware components, which for simplicity of illustration and description are herein designated rows, racks, drawers, cards and couplings (ports). The hierarchy expresses a containment relationship, i.e., a row contains one or more racks, a rack contains one or more drawers, a drawer contains one or more cards, and a card may (optionally) contain one or more ports or other couplings for cables or other devices.

As used herein, a physical indicator is a physical device capable of assuming any of multiple states perceptible by a human user, and in which the location of the physical indicator is intended to convey information to the human user. In the preferred embodiment, physical indicators are lights such as light-emitting diodes (LEDs) which direct the user's attention to the indicator's location, although a physical indicator might conceivably be some other form of indicator. Often, the indicator light (or other physical indicator) is physically mounted on the hardware component with which it is associated, although this is not necessarily a requirement. For example, a drawer containing multiple cards could mount the card indicator lights on the drawer in locations adjacent to the respective cards.

Some physical hardware components are field replaceable units (FRUs), while others are assemblies of FRUs, and still others might be only part of a FRU. For example, a single electronic circuit card is typically a FRU, and a drawer may be another FRU, so that a drawer containing one or more cards is an assembly of multiple FRUs. However, a port or coupling mounted on a card is typically not a FRU, and can not be replaced independently of the card on which it is mounted.

In the preferred embodiment, at least some physical hardware components can be allocated to specific logical partitions, and in particular, at least some physical hardware components which are not FRUs can be allocated to specific logical partitions. To support allocation of arbitrary logical components, a concept of a "partitionable entity" is employed. A "partitionable entity" is any hardware component which can be independently allocated to one or more logical partitions, either permanently or temporarily. A partitionable entity need not be a FRU, and may specifically be a sub-portion of a FRU. Although a logical partitioning manager may also support allocation of resources which are not hardware (e.g., allocation of software resources to partitions), as used herein a "partitionable entity" refers specifically to a physical device, although it may be a portion of a FRU, a portion of an integrated circuit, or some other portion of a physical component or assembly.

Figure 2:
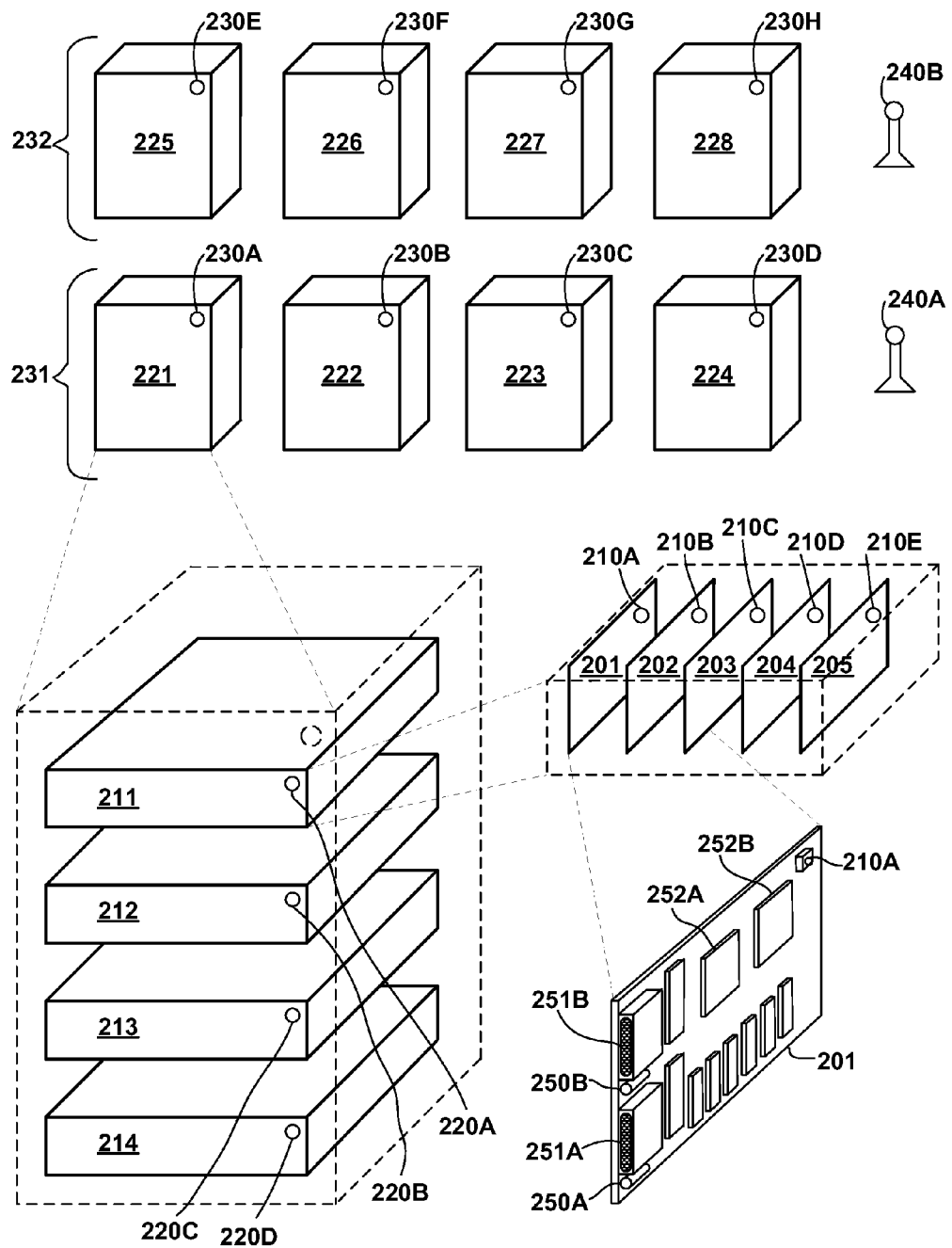
FIG. 2 is a simplified representation of a hierarchy of physical units and indicator lights in the computer system of the preferred embodiment.

FIG. 2 is a simplified representation of the hierarchy of physical units and indicator lights in computer system 100, according to the preferred embodiment. As shown in FIG. 2, the lowest level FRU is typically an electronic circuit card 201-205 or equivalent. Although "cards" are shown in FIG. 2 and described in the illustrative embodiment herein, it should be understood that a FRU at the lowest level of the hierarchy could be something other than a card. For example, it could be a special form factor assembly which is intended to populate a larger enclosure of multiple such form factors. Such a form factor assembly could contain a rotating disk drive storage unit, or some other hardware component. Multiple cards 201-205 are housed in a single card frame assembly 211, which is referred to herein as a "drawer". Multiple drawers 211-214 are housed in a single "rack" 221. In the preferred embodiment, a rack is a large freestanding cabinet housing multiple drawers and auxiliary components, such as power distribution and cooling systems. The drawer is a physical drawer which can be pulled out of the rack for access. Multiple racks 221-228 can be arranged in sets of racks, herein referred to as rows 231-232. In the representation of FIG. 2, two rows 231-232 are shown, racks 221-224 corresponding to row 231, and racks 225-228 corresponding to row 232. It should be understood that the hierarchy of FRUs according to the preferred embodiment is simply one physical packaging design implementation for a large computer system, that the number of levels of hierarchical hardware components may vary as well as the design of individual hardware components, and many other variations are possible. Furthermore, although referred to herein as FRUs and designed as such in the preferred embodiment, whether each unit of the hierarchy is indeed field replaceable is a design and marketing decision involving many factors. It would, for example, be possible to embody multiple cards in a single FRU assembly, which is not further divisible or replaceable in the field.

Within a FRU at the lowest level, e.g., a card, there may further exist multiple additional physical components which, though not field replaceable, are independently allocable to logical partitions, i.e., are "partitionable entities". As shown in FIG. 2, exemplary card 201 contains ports 251A, 251B (herein generically referred to as feature 251) and electronic modules 252A, 252B (herein generically referred to as feature 252). Ports 251 and specific modules 252 are examples of partitionable entities, i.e., hardware resources which could be independently allocable to logical partitions. Modules could be, for example, processor modules, memory modules, ASICs, etc. Although card 201 is shown in the example of FIG. 2 having partitionable entities in the form of two ports 251 and two modules 252, this number may vary, and partitionable ports 251 would not necessarily exist on the same circuit card as partitionable modules 252.

Each row 231, 232 of racks has a respective physical indicator (indicator light) 240A-B, each rack has a respective physical indicator (indicator light) 230A-H, and each drawer a respective physical indicator (indicator light) 220A-D. Some, but not necessarily all, cards have respective indicator lights 210A-E. Furthermore, some, but not necessarily all, partitionable entities which are not themselves FRUs may have respective indicator lights. In the example of FIG. 2, indicator lights 250A, 250B are associated with ports 251A, 251B, respectively, although the ports are not themselves FRUs.

The use of indicator lights in a hierarchy associated with a hierarchy of physical packaging allows one to easily determine the location of a particular physical unit at the lowest level, e.g., a card, or in some cases, a port within a card. Such entities may not be visible or may be difficult to see when the drawer is fully closed in the rack. To identify a particular card, the indicators for the row, rack and drawer containing the card are activated. A person may then follow the chain of indicator lights to the correct drawer, open the drawer, and find the correct card (which, if it has an indicator light, should also be lit up). A similar procedure can be used for identifying a port. Although the particular hierarchy of row, rack, drawer and card (and optionally, port) is used in the preferred embodiment, it will be understood that one could alternatively light up other components or fewer than all of these components, and that lights need not be associated with FRUs.

Figure 3:
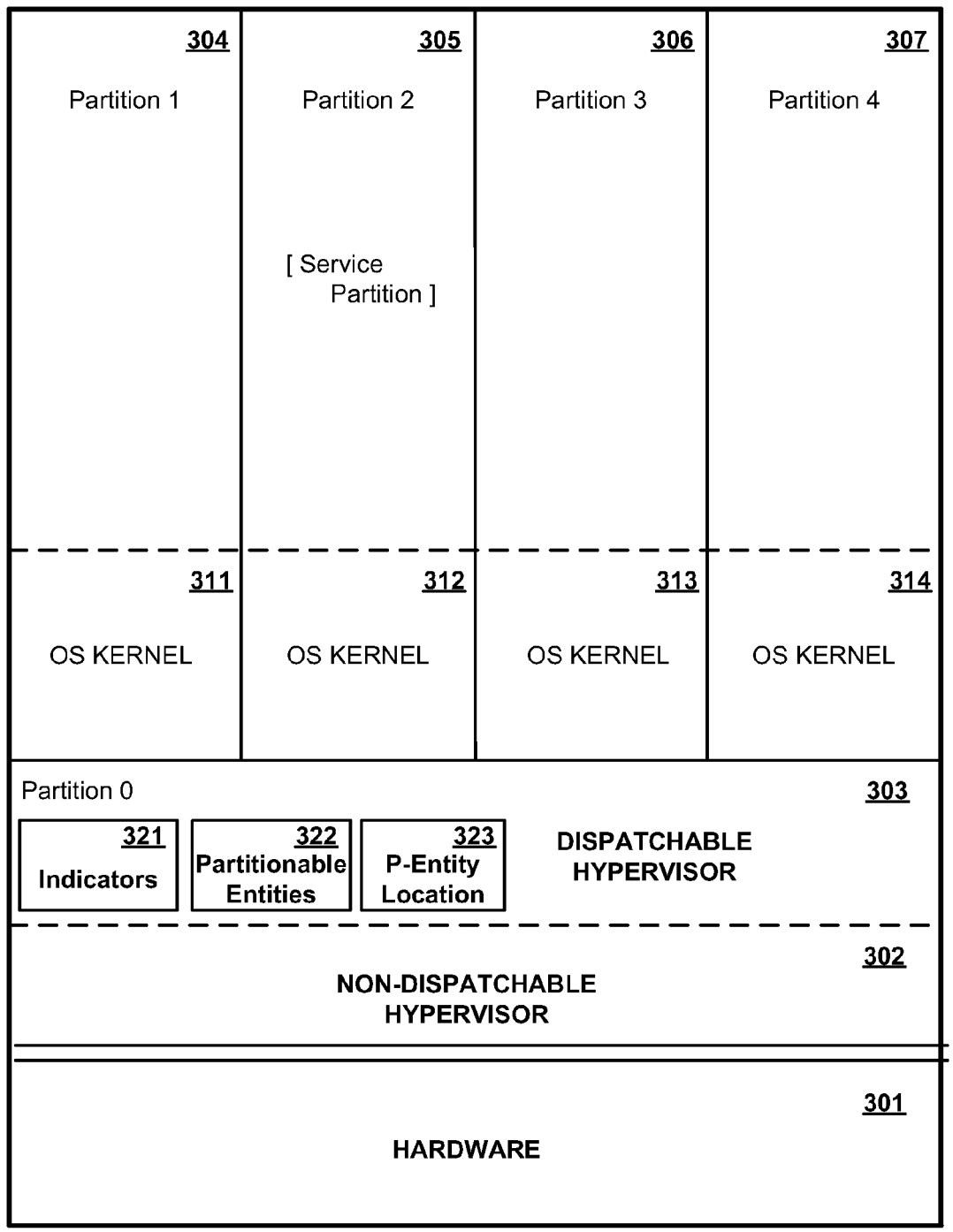
FIG. 3 is a conceptual illustration showing the existence of logical partitions at different hardware and software levels of abstraction in a computer system, according to the preferred embodiment.

FIG. 3 is a conceptual illustration showing the existence of logical partitions at different hardware and software levels of abstraction in computer system 100. FIG. 3 represents a system having four logical partitions 304-307 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 3, the "higher" levels of abstraction are represented toward the top of the figure, while lower levels are represented toward the bottom.

As shown in FIG. 3 and explained earlier, logical partitioning is a code-enforced concept. At the hardware level 301, logical partitioning does not exist. As used herein, hardware level 301 represents the collection of physical devices (as opposed to data stored in devices), such as processors, memory, buses, I/O devices, etc., shown in FIGS. 1 and 2, possibly including other hardware not shown in FIGS. 1 and 2. As far as a processor of CPU 101 is concerned, it is merely executing machine level instructions. In the preferred embodiment, each processor is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 3 as a single entity 301, which does not itself distinguish among logical partitions.

Partitioning is enforced by a partition manager (also known as a "hypervisor"), consisting of a non-relocatable, non-dispatchable portion 302 (also known as the "non-dispatchable hypervisor" or "partitioning licensed internal code" or "PLIC"), and a relocatable, dispatchable portion 303. The hypervisor is super-privileged executable code which is capable of accessing resources, such as processor resources and memory, assigned to any partition. The hypervisor maintains state data in various special purpose hardware registers, and in tables or other structures in general memory, which govern boundaries and behavior of the logical partitions. Among other things, this state data defines the allocation of resources to logical partitions, and the allocation is altered by changing the state data rather than by physical reconfiguration of hardware.

In the preferred embodiment, the non-dispatchable hypervisor 302 comprises non-relocatable instructions which are executed by CPU 101 just as instructions for tasks executing in the partitions. The code is non-relocatable, meaning that the code which constitutes the non-dispatchable hypervisor is at a fixed real address in memory. Non-dispatchable hypervisor 302 has access to the entire real memory range of system 100, and can manipulate real memory addresses. The dispatchable hypervisor code 303 (as well as all partitions) is contained at addresses which are relative to a logical partitioning assignment, and therefore this code is relocatable. The dispatchable hypervisor behaves in much the same manner as a user partition (and for this reason is sometimes designated "Partition 0"), but it is hidden from the user and not available to execute user applications. In general, non-dispatchable hypervisor 302 handles assignment of tasks to physical processors, memory mapping and partition enforcement, and similar essential partitioning tasks required to execute application code in a partitioned system, while dispatchable hypervisor 303 handles maintenance-oriented tasks, such as creating and altering partition definitions.

As represented in FIG. 3, there is no direct path between higher levels (levels above non-dispatchable hypervisor 302) and hardware level 301. While machine instructions of tasks executing at higher levels can execute directly on the processor, access to hardware resources is controlled by the non-dispatchable hypervisor. Non-dispatchable hypervisor 302 enforces logical partitioning of processor resources. I.e., task dispatchers at a higher level (the respective operating systems) dispatch tasks to virtual processors defined by the logical partitioning parameters, and the hypervisor in turn dispatches virtual processors to physical processors at the hardware level 301 for execution of the underlying task. The hypervisor also enforces partitioning of other resources, such as allocations of memory to partitions, and routing I/O to I/O devices associated with the proper partition.

Dispatchable hypervisor 303 performs many auxiliary system management functions which are not the province of any partition. The dispatchable hypervisor generally manages higher level partition management operations such as creating and deleting partitions, concurrent hardware maintenance, allocating processors, memory and other hardware resources to various partitions, etc. In particular, the dispatchable hypervisor handles access to physical indicator lights. Dispatchable hypervisor 303 includes a state data structure of visual indicators 321, a state data structure of partitionable entity allocations to partitions 322, and a state data structure of partitionable entity locations 323, which, in conjunction with dispatchable hypervisor code, are used to regulate access to and activate and deactivate physical indicator lights, as described in greater detail herein.

A special user interactive interface is provided into dispatchable hypervisor 303, for use by a system administrator, service personnel, or similar privileged users. In the preferred embodiment, i.e., where system 100 contains a service processor 103 and attached hardware management console 114, the HMC 114 provides an interface to the dispatchable hypervisor for service and partition management, and will so be assumed in the description herein. Such an interface could be provided by alternative means.

Above non-dispatchable hypervisor 302 are a plurality of logical partitions 304-307. Each logical partition behaves, from the perspective of processes executing within it, as an independent computer system, having its own memory space and other resources. Each logical partition therefore contains a respective operating system kernel herein identified as the "OS kernel" 311-314. At the level of the OS kernel and above, each partition behaves differently, and therefore FIG. 3 represents the OS Kernel as four different entities 311-314 corresponding to the four different partitions. In general, each OS kernel 311-314 performs roughly equivalent functions. However, it is not necessarily true that all OS kernels 311-314 are identical copies of one another, and they could be different versions of architecturally equivalent operating systems, or could even be architecturally different operating system modules. OS kernels 311-314 perform a variety of task management functions, such as task dispatching, paging, enforcing data integrity and security among multiple tasks, and so forth.

Above the OS kernels in each respective partition there may be a set of high-level operating system functions, and user application code and data (not shown). A user may create code above the level of the OS Kernel, which invokes high level operating system functions to access the OS kernel, or may directly access the OS kernel. In the IBM i™ Operating System, a user-accessible architecturally fixed "machine interface" forms the upper boundary of the OS kernel, (the OS kernel being referred to as "SLIC"), but it should be understood that different operating system architectures may define this interface differently, and that it would be possible to operate different operating systems on a common hardware platform using logical partitioning.

One and only one of the logical partitions is designated the service partition. In FIG. 3, partition 305 is designated a service partition. The service partition is the partition assigned for use by system maintenance personnel to perform various administrative and maintenance functions. The service partition may be used exclusively for administrative and maintenance functions, or it may also be used for user applications. However, where system 100 contains a hardware management console 114 as shown in the preferred embodiment, most of the service and maintenance functions are performed from the hardware management console rather than the service partition. Where system 100 contains no hardware management console, the service partition is capable of performing a subset of the functions supported on the hardware management console.

While various details regarding a logical partitioning architecture have been described herein as used in the preferred embodiment, it will be understood that many variations in the mechanisms used to enforce and maintain logical partitioning are possible consistent with the present invention, and in particular that administrative mechanisms such as a service partition, service processor, hardware management console, dispatchable hypervisor, and so forth, may vary in their design, or that some systems may employ some or none of these mechanisms, or that alternative mechanisms for supporting and maintaining logical partitioning may be present.

In the preferred embodiment, a hierarchical location code is associated with each partitionable entity, the hierarchical location code specifying a physical containment relationship as illustrated in FIG. 2. A process executing within a partition has access to partitionable entities assigned to that partition as recorded by the hypervisor. Using the containment hierarchy, such a process can access virtual indicators (if any) associated with the partitionable entities, and with certain physical devices which contain the partitionable entities. This access ability is regulated by the hypervisor, using data structures which record the allocation of partitionable entities to partitions and the containment relationship. The states of the physical indicators are derived from virtual indicator states.

Figure 4:
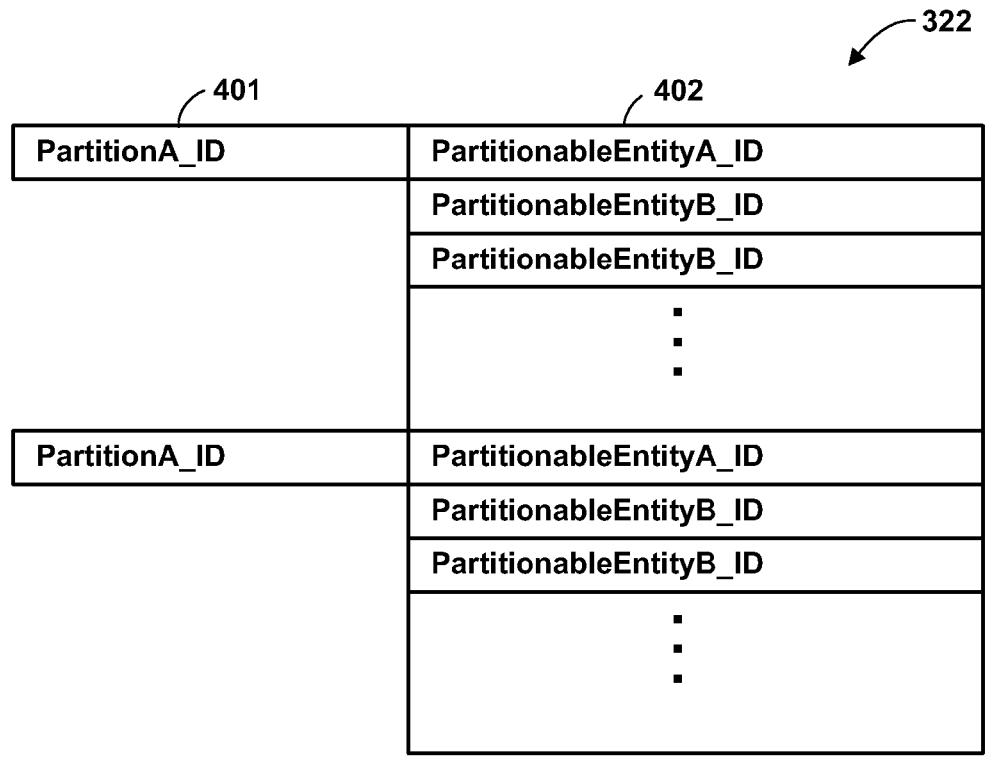
FIG. 4 is a simplified conceptual representation of a partitionable entity data structure, according to the preferred embodiment.

FIG. 4 is a simplified conceptual representation of a partitionable entity data structure 322 which records, for each partition, one or more partitionable entities allocated to that partition. As shown in FIG. 4, partitionable entity data structure 322 records a partition identifier 401 identifying each partition, and with respect to each partition, one or more partitionable entity identifiers 402 identifying a respective partitionable entity which has been allocated to the corresponding partition. In the preferred embodiment, a partitionable entity is allocated to only one partition at a given time. However, from the standpoint of the architecture of data structure 322, there is no restriction on the number of partitions to which a single partitionable entity might be allocated. I.e., it would alternatively be possible for a single partitionable entity to appear among the partitionable entity identifiers 402 allocated to a first partition, and simultaneously to be duplicated in the partitionable entity identifiers 402 allocated to a second partition, provided that other applicable restrictions in system hardware and/or software which prevent a partitionable entity from being allocated to more than one partition at a given time, or otherwise limit the number of partitions to which a partitionable entity may be allocated, are not violated.

Figure 5:
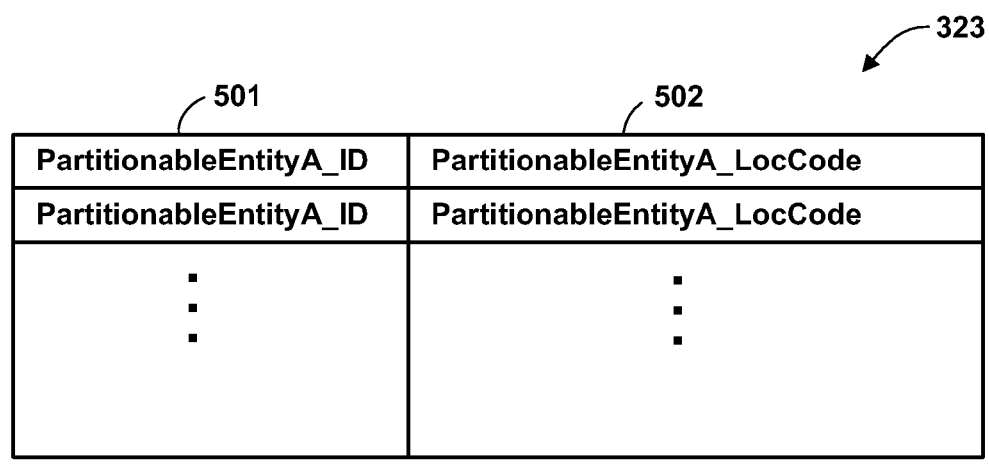
FIG. 5 is a simplified conceptual representation of a location code data structure, according to the preferred embodiment.

FIG. 5 is a simplified conceptual representation of a location code data structure 323 which records, for each partitionable entity, a corresponding location code identifying the physical containment location of the partitionable entity in the hierarchy of physical devices. As shown in FIG. 5, location code data structure 323 contains a plurality of entries, each associating a respective partitionable entity identifier 501 with a respective partitionable entity location code 502.

The partitionable entity location code 502 is preferably a string of multiple concatenated elements, in which the first element represents an identifier of a device at one end of the physical hierarchy in which devices are packaged, and each succeeding element represents an identifier of a device at a next or previous level of the hierarchy. The elements are preferably separated by delimiters (such as "."), although other means of identifying the elements (such as fixed-length fields) could alternatively be used. As described herein, the first string element is the highest level of the hierarchy (corresponding to a row 231, 232), and each succeeding string element represents a device at the next lower level of the hierarchy, it being understood that this order could be reversed, or that some other format for a hierarchical location code could be employed. For example, a hierarchical location code for a drawer designated DrawerC might take the form:

RowA_ID.RackB_ID.DrawerC_ID;

while a hierarchical location code for a port designated PortE located on a card designated CardD within DrawerC would take the form:

RowA_ID.RackB_ID.DrawerC_ID.CardD_ID.PortE_ID;

where '.' acts as a delimiter. The string need not contain all elements of the hierarchy if the identifiers are unique. In an exemplary embodiment, the drawer IDs are unique in the system, and the string does not contain row and rack IDs.

FIG. 6 is a simplified conceptual representation of virtual, real and physical indicator states managed by the hypervisor, according to the preferred embodiment. Referring to FIG. 6, each row pair in the figure represents a single physical indicator light, there being lights associated with cards, drawers, racks, rows of racks, and, in some cases, sub-components of cards, such as ports. These are not all treated identically. A separate column (P1, P3 and P4) is assigned to each respective partition and represents the virtual view of indicator light state which is viewable and settable by the respective partition (not including partition 0, which is the dispatchable hypervisor itself). An additional separate column represents the virtual indicator light settings made under the control of the process executing in a client having service authority, such as a process in the hardware management console, or a process in the service partition, or some other process with service authority. Virtual indicators in this column are herein designated "service authority client" virtual indicators or "SAC" indicators. An additional column, designated "Real Ind's", represents an indicator light state which is derived as a function of the states of the virtual indicator lights in the same row of FIG. 6. These are referred to herein as "real indicators", it being understood that they do not directly represent the state of a physical indicator light, but are derived as a composite of the states of the virtual indicators, as explained herein. Finally, a last column, designated "Physical Indicators", represents the actual physical state of the corresponding indicator light.

In the preferred embodiment, each virtual or real indicator has only two possible states, which are represented as "+/−" in FIG. 6. However, the physical indicator light has three possible states, these being derived from the states of the corresponding pair of real indicators. A row of virtual indicators and their corresponding real indicator are data which represent the virtual states and corresponding composite real state, respectively, of a condition indicator. I.e., all the virtual and real indicator states in a row relate to a common "condition" being indicated, although each partition as well as the service authority client has its own independent virtual view of that condition state. In the preferred embodiment, the conditions comprise an identify condition and a fault condition. These share a common physical indicator. Each component having a physical indicator has an identify real indicator (ID) and a fault real indicator (Flt). Preferably, if the identify real indicator is in an active state, the corresponding physical light is flashing. If the fault real indicator is in the active state, the corresponding physical light is constantly on. If both real indicators are active, the identify takes precedence over the fault, and the corresponding physical light is flashing. It will be understood that other states or representations in the physical indicator and/or other rules of priority could be used.

The states of the identify real indicator and the fault real indicator for a common physical indicator are completely independent of each other; they are independently settable and resettable, and are independently recorded as separate data. The physical indicator state is always derived from the states of the two real indicators, as explained above. A change in either real indicator could, but will not necessarily, change the state of the physical indicator. For example, if both real indicators are active and the fault real indicator transitions to an inactive state, there would be no change in the physical indicator state, since both before and after the fault indicator transition, the physical indicator would be in the flashing (identify) state.

In the preferred embodiment, the hypervisor maintains an indicator state data structure 321 for virtual and real indicators associated with drawers, cards, and some sub-components of cards, as explained in greater detail below with respect to FIG. 7. The virtual and real indicators are simply data in data structure 321, and are not necessarily the same as the state of the corresponding physical indicator light. Virtual indicators, i.e., indicators associated with specific partitions, are provided for components (except racks and rows) which might be shared by more than one partition. In this embodiment, each partition has virtual indicators for all drawers, selective cards, and selective sub-components of cards, as well as there being a single set of virtual indicators for the set of service authority clients (e.g., HMC's or service partition). Virtual indicators can be set or read by the hypervisor at the request of processes executing within the respective user partitions or service authority client with which the virtual indicators are associated; these processes can not access virtual indicators of other partitions, or the real indicators. In the preferred embodiment, service authority clients have indirect control over others' virtual indicators in that a request by a service authority client to deactivate an indicator light for a hardware component causes the hypervisor to deactivate the corresponding service authority client virtual indicator along with all other virtual indicators of that type associated with the specified hardware component, but the service authority client is unable to read the others' virtual indicators.

The state of a rack or row indicator is derived from the states of its components. I.e., the state of a rack real indicator is the logical OR of the states of the corresponding real indicators for all drawers within the rack, and the state of a row real indicator is the logical OR of the states of the corresponding real indicator for all racks within the row. The row and rack lights are activated and deactivated automatically based on the result of a logical OR function on the constituent rack and drawer indicators, respectively. This is represented in FIG. 6 by the dashed line box, which shows that these state elements are not in fact recorded in data structure 321 or directly set by the hypervisor, but are illustrated in FIG. 6 only for completeness of representation.

The rows at the top of FIG. 6 represent several components (Comp1, Comp2, Comp3) which do not have corresponding physical indicators. These rows are intended to illustrate that the system may include components which do not contain physical indicators, but which might be partitionable entities. I.e., the concept of a "partitionable entity" in not necessarily limited to components having physical indicators. For example, a processor chip mounted on a card might be a "partitionable entity", although it typically would not have a physical indicator. However, where no such physical indicator exists, the component would typically not have a corresponding entry in data structure 321.

As shown in FIG. 6, each partition has a virtual view of the indicator lights associated with drawers. A partition can independently set or read its virtual indicators. A partition has no capability to set or read the virtual indicators associated with a different partition.

In the preferred embodiment, a partition can access a virtual indicator associated with a drawer only if the partition accesses some resource associated with that drawer, e.g., if one of the cards assigned to the partition is physically located within the drawer. In the case of a card, a partition can access a virtual indicator associated with the card if either the card is accessible by the partition or the partition accesses a partitionable entity within the card. A sub-component of a card will have virtual indicators associated with it only if there is some physical indicator associated with that sub-component. In this case, a partition can access the corresponding virtual indicator if it is authorized to access the sub-component.

Although FIG. 6 illustrates a virtual indicator for each partition for the drawers, selective cards and components, it will be understood that in some cases only selective partitions will have access to the resource. Where a partition does not have access to a shareable resource, the corresponding virtual indicator, to the extent it is actually recorded in memory, is permanently set off.

FIGS. 4-6 are intended to be conceptual representations to illustrate the association of partitions, partitionable entities and other components, hierarchical location codes, and indicators, which is performed by data structures 321, 322 and 323. Data structures 321, 322 and/or 323 may be combined or may be separate, may contain additional data not necessary to an understanding of the present invention, may be organized according to any technique for organizing data, now known or hereafter developed, such as a linked list, table, binary tree, etc., and need not occupy contiguous locations of memory. In particular data structure 321 is preferably implemented as a linked list, as described below.

Preferably, real indicator state is derived as a logical OR of virtual indicator states without direct access by partitions to the real indicator states, as described in greater detail in U.S. Pat. No. 7,076,570 to Ahrens et al., issued Jul. 11, 2006, herein incorporated by reference.

In the preferred embodiment, visual indicator state data structure 321 is embodied as a linked list having a variable number of elements, each element corresponding to a currently active physical indicator. I.e., data structure 321 actually contains a record of certain state data for only the active physical indicators. If any physical indicator is inactive, then it is known that all real indicators and virtual indicators which correspond to it are also inactive (since if any such component indicator were active, the physical indicator would also be active), and there is no corresponding list element in data structure 321. In general, it is expected that relatively few indicators will be active at any given time, and that much of the time no indicator will be active. Where the number of partitions and indicators could be large, maintaining a record of only the currently active indicators not only saves space in memory, but reduces the average time required to determine a current state of an indicator.

Figure 7:
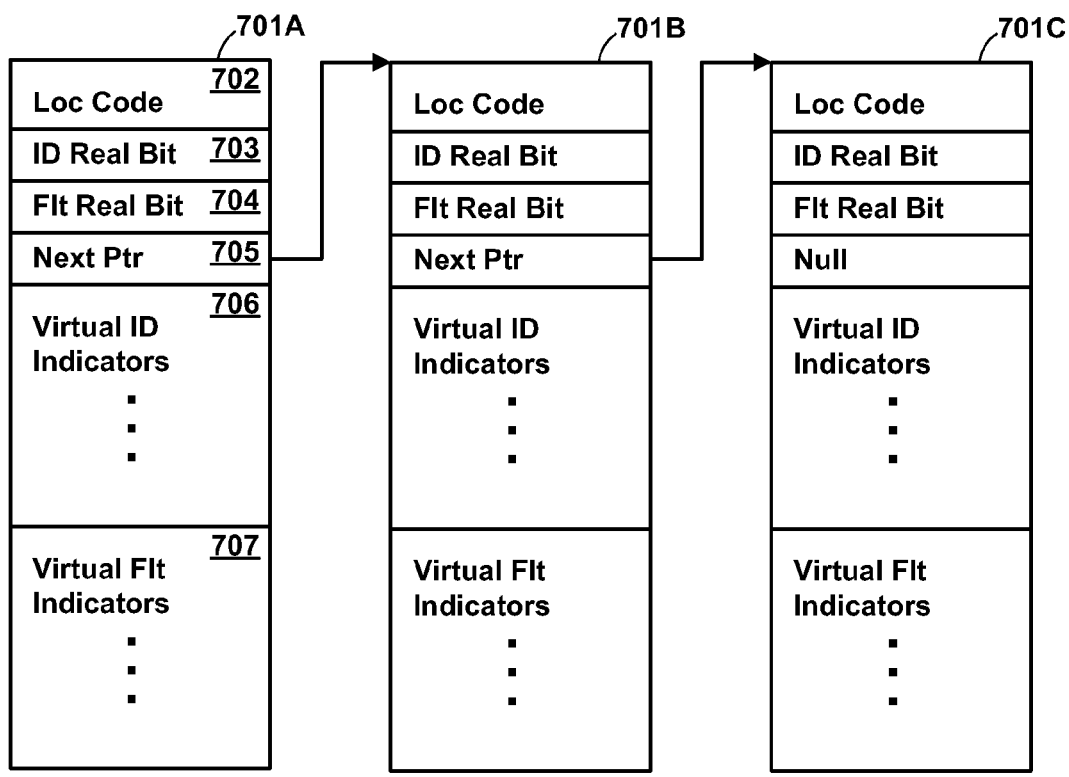
FIG. 7 is a simplified representation of an indicator state data structure embodied as a linked list, according to the preferred embodiment.

FIG. 7 is a simplified representation of data structure 321 embodied as a linked list, according to the preferred embodiment. Data structure 321 contains a variable number of list elements 701A, 701B, 701C (herein generically referred to as feature 701), of which three are shown in FIG. 7. Each element 701 contains a location code field 702 of the corresponding physical indicator, an identify real indicator state bit 703 reflecting the current state of the identify real indicator, a fault real indicator state bit 704 reflecting the current state of the fault real indicator, a pointer to the next list element 705, current states of the virtual identify indicators 706 corresponding to the list element's physical indicator, and current states of the virtual fault indicators 707 corresponding to the list element's physical indicator. The virtual indicator states 706 and 707 are conceptually arrays (as represented in FIG. 6). In the preferred embodiment, these are implemented as separate bitfields, one bitfield corresponding to the virtual identify indicators and another to the virtual fault indicators, where each bit in the bitfield corresponds to a respective partition (or service authority client). However, these could alternatively be implemented as arrays, linked list structures which identify only the active virtual indicators, or in some other form. It will be understood that elements 701 could contain other or additional data fields, and that data structure 321 need not be implemented as a linked list as described herein, but could be implemented as an array or as some other data structure.

The physical state of the indicator is a function of real indicator bits 703 and 704, which are independently settable. It is not necessary to maintain a separate record of physical indicator state. The hypervisor refers to the states of both these bits whenever it is necessary to re-evaluate the state of the physical indicator, and issues a state change message only where there has been an actual change in physical indicator state as a result of a change in the state of one of the constituent real indicators. As noted, not all changes in real indicator state produce a corresponding change in physical indicator state.

The hypervisor is responsible for regulating access to virtual indicators. In particular, the hypervisor must determine whether a process executing in a partition is entitled to set a virtual indicator for a physical device (hardware unit), not only for physical devices which are wholly allocated to that partition, but for shared devices to which the partition is given access by virtue of allocation to the partition of a partitionable entity contained on the device. For example, if a partitionable entity which is a sub-component of a circuit card is allocated to a partition P, then the partition is entitled to access the pair of virtual indicators for the circuit card which contains the partitionable entity, and entitled to access the pair of virtual indicators for the drawer which contains the circuit card which contains the partitionable entity.

Figure 8:
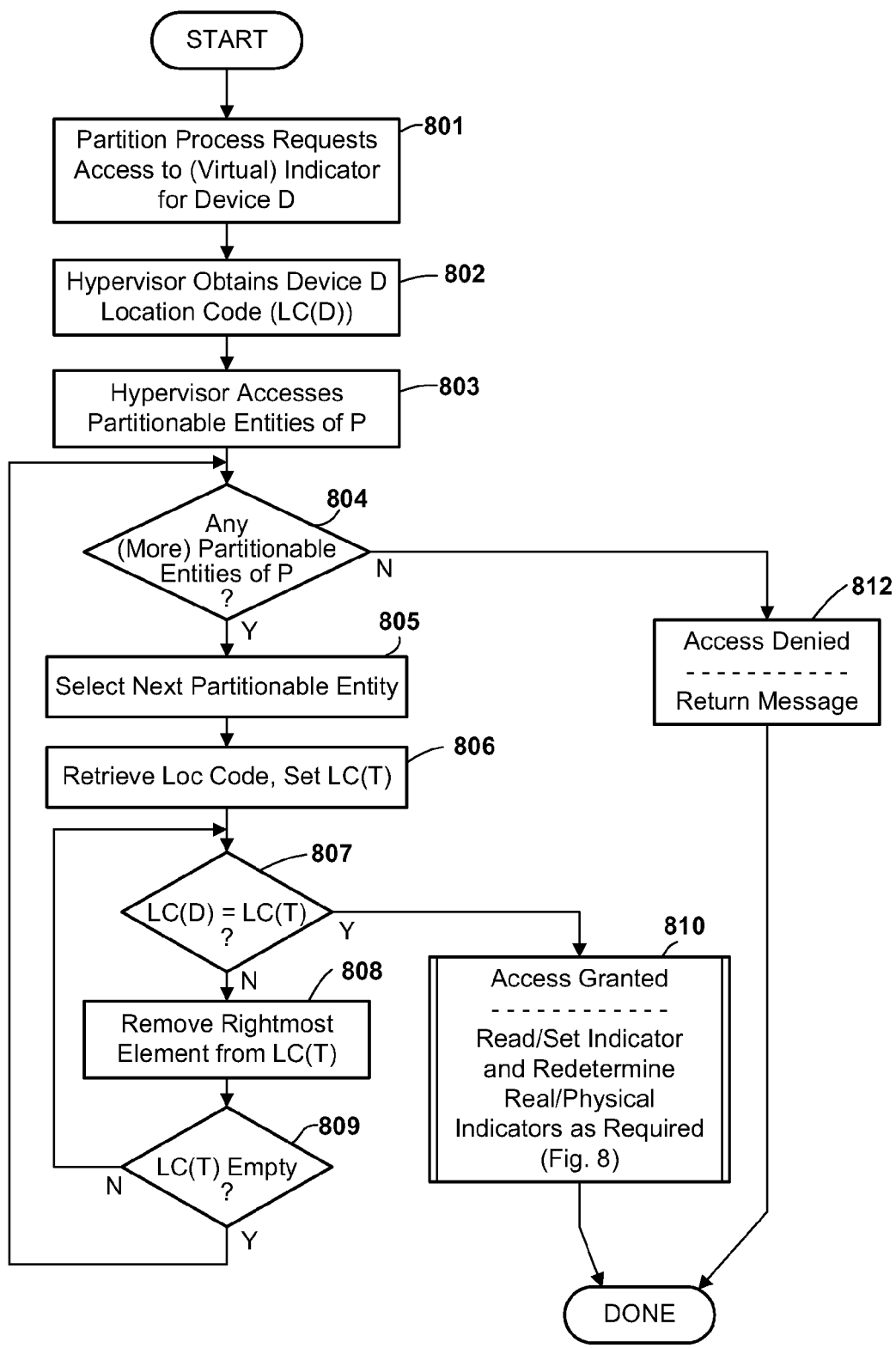
FIG. 8 is a high-level flow diagram showing a hypervisor process of determining whether a process executing within a partition can access a virtual indicator corresponding to a device, according to the preferred embodiment.

FIG. 8 is a high-level flow diagram showing a hypervisor process of determining whether a process executing within a partition P can access a virtual indicator corresponding to a device D, according to the preferred embodiment.

Referring to FIG. 8, a process executing within a partition P invokes dispatchable hypervisor 303 to access (i.e., either change or read) the state of an indicator corresponding to device D (step 801). From the standpoint of the process executing in partition P, it is accessing a physical indicator; however, as explained herein, it is in reality accessing a virtual indicator associated with partition P. The virtual indicator could be either an identify virtual indicator or a fault virtual indicator. The requesting process may in some cases pass the hierarchical location code of the desired indicator. If the requesting process does not pass this data, the hypervisor accesses location code data 323 to obtain the hierarchical location code string of device D, herein designated LC(D) (step 802).

The hypervisor accesses partitionable entity data 322 to obtain a list or other record of partitionable entities which have been allocated to partition P (step 803). This list is then traversed one at a time to attempt to match a location code from a partitionable entity on the list with LC(D). These steps are represented as steps 804-809.

If any (more) partitionable entities allocated to partition P and obtained at step 803 remain to be evaluated, the 'Y' branch is taken from step 804. A next partitionable entity is then selected (step 805). The location code of the selected partitionable entity is then retrieved from location code data 323, and a test value LC(T) is set to the location code of the selected partitionable entity (step 806).

If LC(D) is equal to LC(T), then the selected partitionable entity matches the location code of the device for which access to the virtual indicator is sought; in this case, the 'Y' branch is taken from step 807, and access is granted. If LC(D) is not equal to LC(T), then the 'N' branch is taken from step 807, and the rightmost element in location code string LC(T) is removed (step 808). If the string is now non-empty, the 'N' branch is taken from step 809 and the test at step 807 is repeated.

Steps 807-809 are repeated until either the test string LC(T) becomes empty (indicating that the selected partitionable entity is not within the location hierarchy of device D), or a LC(T) equals LC(D) (indicating that the selected partitionable entity is within the location hierarchy of device D). In the former case, the 'Y' branch is taken from step 809, and the hypervisor process returns to step 804. In the latter case, the 'Y' branch is taken from step 807 to step 810. Access is then granted to the requested virtual indicator, and the hypervisor performs the requested access action, either setting or reading the virtual indicator, and redetermining the states of real and physical indicators as required. This process is represented as step 810 in FIG. 8, and is shown in greater detail in FIG. 9.

If the entire list of partitionable entities allocated to partition P has been traversed without finding a match (i.e., without taking the 'Y' branch from step 807), the 'N' branch will be taken from step 804, and access to the requested virtual indicator will be denied (step 812). In this case, the hypervisor may generate an appropriate message to the requesting process or take other recovery action as appropriate.

Figure 9A:
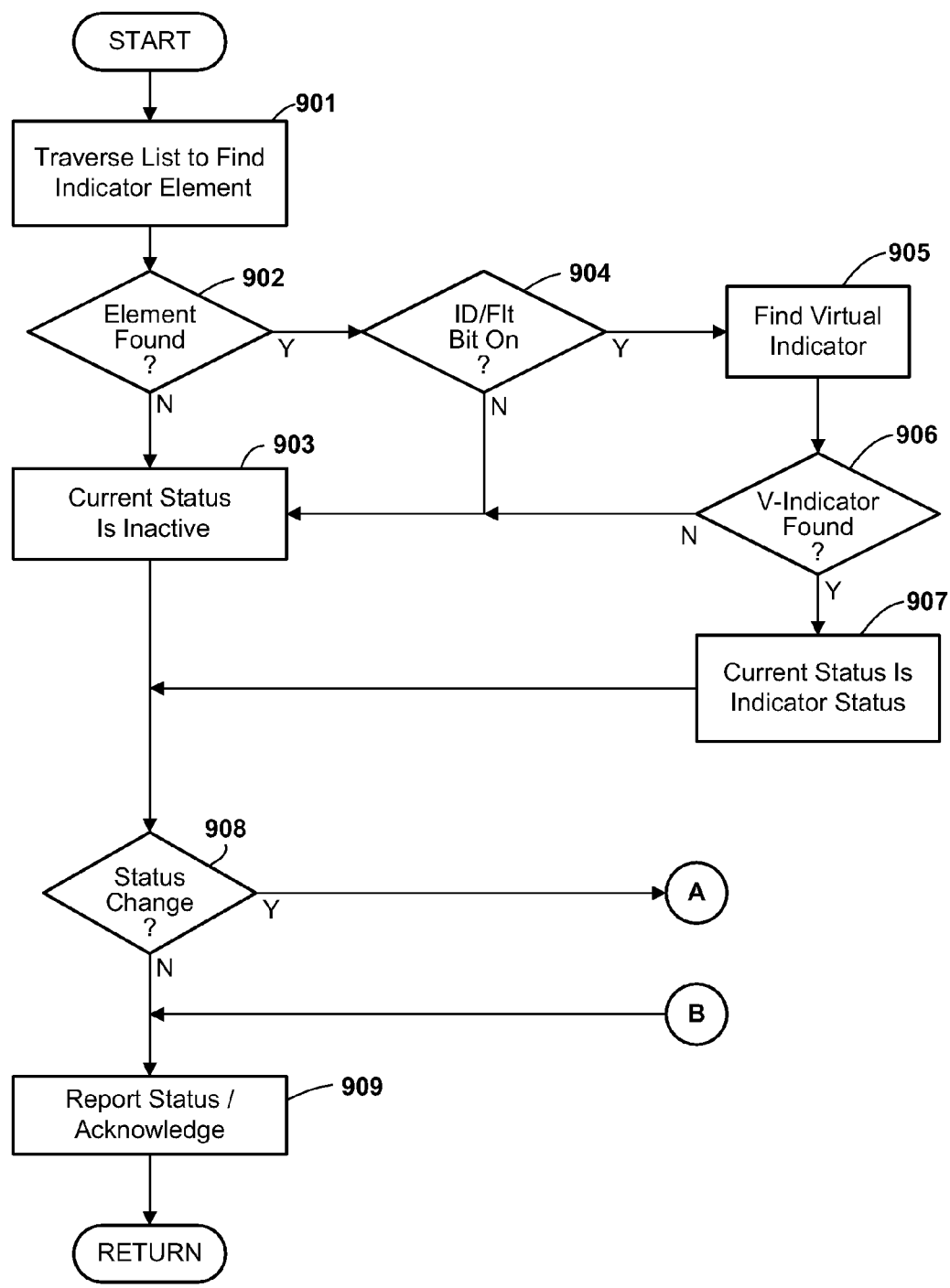
FIGS. 9A and 9B (herein collectively referred to as FIG. 9) are a high-level flow diagram showing a hypervisor process of reading and/or setting an indicator on behalf of a partition to which access has been granted, according to the preferred embodiment.
Figure 9B:
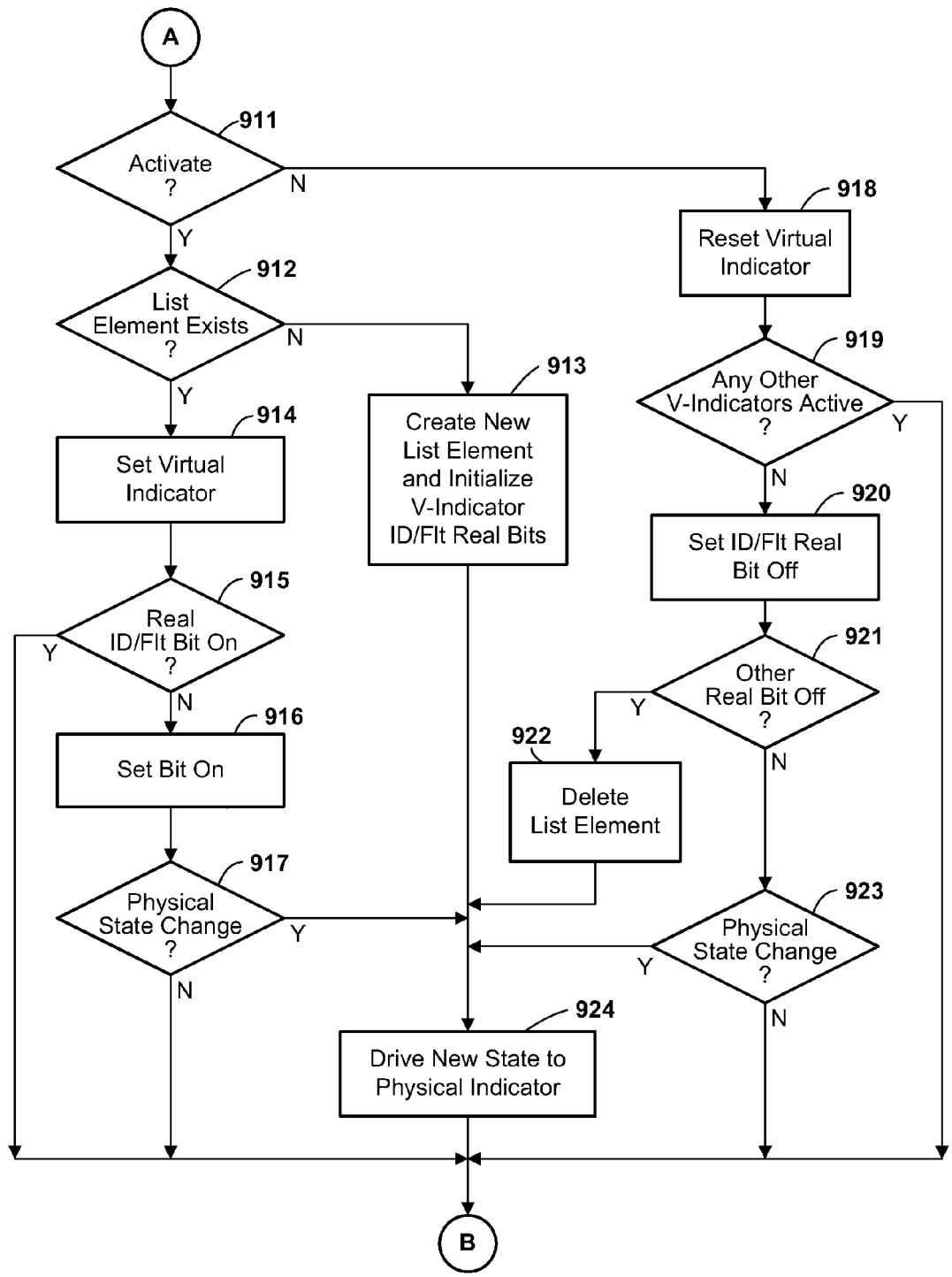

FIGS. 9A and 9B (herein collectively referred to as FIG. 9) are a high-level flow diagram showing a hypervisor process of reading and/or setting an indicator on behalf of a partition to which access has been granted to the indicator using the process described above with respect to FIG. 8, according to the preferred embodiment.

Referring to FIG. 9, the hypervisor accesses and traverses the indicator state data structure 321 to find a list element 701 corresponding to the indicator to be accessed, i.e., having the same location code in field 702 (step 901). If no such element is found, the 'N' branch is taken from step 902, and the current indicator state is inactive (step 903). If such an element is found, but the current applicable real ID bit 703 or real Fault bit 704 is inactive (i.e., the bit corresponding to the real indicator state (either an ID or fault indicator) to be accessed), then the 'N' branch is taken from step 904, and the current indicator state is likewise inactive (step 903). If the element is found and the applicable ID bit 703 or Fault bit 704 is active, the 'Y' branch is taken from step 904, and the virtual ID indicators 706 or Fault indicators 707 are examined to find an indicator corresponding to the requesting partition (step 905). If no such indicator is found, the 'N' branch is taken from step 906, and the current indicator state is inactive (step 903);

otherwise, the current status of the requested accessed indicator is as shown by the applicable virtual ID indicator 706 or fault indicator 707 (step 907).

If no change is requested to the existing indicator value (either because the access was only to read the current value, or because the new value to be written is the same as the current value), then the 'N' branch is taken from step 908, and steps 911-924 are by-passed.

The hypervisor returns reporting status, such as reporting the current value in the case of a read or acknowledging setting a new value in the case of a write (step 909). If a change is requested to the existing value, the 'Y' branch is taken from step 908.

If the virtual indicator is being activated (changed from an inactive state to an active state), the 'Y' branch is taken from step 911. If no list element 701 in data structure 321 exists for the corresponding physical indicator, the 'N' branch is taken from step 912, and a new list element is generated at step 913, the new element being initialized to reflect the new state (step 913). A list element could already exist because this or another partition has activated the same real indicator, or a different real indicator which shares the same physical indicator. The physical indicator is activated to its new state (step 924).

In the preferred embodiment, the hypervisor activates the physical indicator at step 924 by transmitting a message over a special communications medium called a "system power control network" (not shown) to the applicable hardware component, which activates the indicator accordingly. The system power control network is a relatively low-speed, low bandwidth communications medium, used for controlling power, activating/deactivating indicator lights, certain diagnostics, and so forth. To avoid overtaxing this network, it is desirable to make all state determinations in the hypervisor, and to send state messages to the physical indicators only if it has been determined that there is a physical state change. It will be understood that alternative means for activating a physical indicator could be provided.

If at step 912, a list element already exists, the 'Y' branch is taken, and the virtual indicator corresponding to the requesting partition and indicator type (ID or fault) is set to an active state in the list element (step 914). The current state of the real indicator corresponding to the virtual indicator being activated is examined. If this real indicator is already active, the 'Y' branch is taken from step 915, and the remaining steps are by-passed. If the real indicator is inactive, the 'N' branch is taken from step 915, the corresponding real indicator state bit (ID or Fault) is set active (step 916), and the physical state re-evaluated, as explained in greater detail below (step 917). If the state of the physical indicator is unchanged, the 'N' branch is taken from step 917, bypassing step 924; otherwise the hypervisor causes the physical indicator to be activated to its new state (step 924).

If, at step 911, the change was from an active to an inactive state, the hypervisor resets the applicable virtual indicator state in the applicable list element 701 (step 918). (In the case of a service authority client process, the hypervisor may reset all virtual indicators, causing the 'N' branch to be taken from step 919.) The hypervisor further determines whether any other partition has activated its virtual indicator corresponding to the same real indicator by examining the virtual indicators in the list element (step 919). If any other partition has activated its virtual indicator corresponding to this real indicator, then the real indicator bit 702 or 703 should remain in an active state; in this case, the 'Y' branch is taken from step 919, and the remaining steps are by-passed. If no other partition has activated its virtual indicator corresponding to this real indicator (the 'N' branch from step 919), then the corresponding real indicator bit 702 or 703 is reset to an inactive state (step 920). If the other real indicator bit of the pair of real indicator bits 702 and 703 in the list element is inactive, then there are no more active virtual indicators corresponding to this physical indicator. In this case, the 'Y' branch is taken from step 921, the list element is deleted (step 922), and the hypervisor causes the corresponding physical indicator to be deactivated (step 924). If, at step 921, the other real indicator of the pair of real indicators is active, then the state of the corresponding physical indicator is re-evaluated (step 923). If the physical indicator state is unchanged, the 'N' branch is taken from step 923, by-passing step 924; otherwise the hypervisor causes the physical indicator to assume its new state (placed in a different active state) at step 924.

At steps 917 and 923, the state of the physical indicator is re-evaluated as a result of a change in state of one of the constituent real indicators. As explained previously, the physical indicator state is derived as a function of the states of the real indicators. I.e., an active fault real indicator causes the physical indicator to be in a constant on state, and an active identify real indicator causes the physical indicator to be in a blinking state. But when both real indicators are active, the identify real indicator takes priority, and the physical indicator is in a blinking state. Because identify real indicators take priority, a change in state of a fault real indicator will not be reflected as a change in the physical indicator if the identify real indicator is already active. Steps 917 and 923 are included to avoid sending a state change message on the system power control network (at step 924) where there has in fact been no state change.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in computer-readable media, and the invention applies equally regardless of the form of distribution. Examples of computer-readable media include, but are not limited to, volatile and non-volatile memory devices, floppy disks, hard-disk drives, CD-ROM's, DVD's, and magnetic tape, it being understood that these examples are not exhaustive. Examples of computer-readable media are illustrated in FIG. 1 as system memory 102 and data storage devices 122.

Unless inconsistent with the invention or otherwise qualified herein, computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be recognized that considerable variation in the hierarchy of physical devices and indicator lights, and in the use of virtual indicators, could be employed consistent with the present invention. Lights could be assigned to different types of devices, and virtual indicators could be used for types of devices other than and/or in addition to those disclosed herein.

Although a specific embodiment of the invention has been disclosed along with certain alternatives, it will be recognized by those skilled in the art that additional variations in form and detail may be made within the scope of the following claims:

What is claimed is:

1. A computer-implemented method for managing hardware indicators for a computer system, comprising:

maintaining a respective condition indicator state for each condition indicator of a plurality of sets of condition indicators, each said set comprising a plurality of said condition indicators and associated with a respective hardware component of said computer system, each said condition indicator state being maintained independently of any other said condition indicator state of the respective said set, each said condition indicator having at least two possible states comprising an active state and an inactive state; and automatically setting a plurality of physical indicators to respective states according to the condition indicator states of said condition indicators, each said physical indicator comprising a physical device having an indicator state perceptible to a human user, each said physical indicator corresponding to a respective set of said plurality of sets of condition indicators, each said physical indicator having at least (N+1) possible states, wherein N is the number of condition indicators in the set of condition indicators with which the physical indicator is associated, the possible states comprising a state in which all condition indicators of the corresponding set are in an inactive state, and a respective state for each condition of the corresponding set being in an active state;

wherein said computer system is partitioned into a plurality of logical partitions, each said partition being allocated a respective subset of resources of said computer system;

wherein a respective set of virtual indicators is associated with each of at least some of said condition indicators, each virtual indicator being associated with a respective partition, and wherein a state of a condition indicator with which a set of virtual indicators is associated is derived as a function of the states of the virtual indicators of the respective set of virtual indicators; and wherein respective processes executing in each partition can access only the virtual indicators associated with the respective partition and are unable to access the virtual indicators associated with other partitions or said condition indicators derived as a function of the states of the virtual indicators of respective sets of virtual indicators.

2. The method of claim 1, wherein each said physical indicator comprises a respective indicator light which can assume any of (N+1) possible states.

3. The method of claim 1, wherein each said set of condition indicators comprises at least one respective fault indicator indicating a fault of the hardware component with which the respective set of condition indicators is associated.

4. The method of claim 1, wherein each said set of condition indicators comprises at least one respective identify indicator indicating an identification of the hardware component with which the respective set of condition indicators is associated.

5. The method of claim 1,
wherein respective processes executing in each partition can alter a state of a virtual indicator associated with the respective partition only if the virtual indicator belongs to a set of virtual indicators associated with a condition indicator which is a member of a set of condition indicators associated with a hardware component associated with the respective subset of resources of said computer system allocated to the respective partition.

6. A computer program product for managing hardware indicators for a computer system, comprising:

a computer-readable medium having computer usable program code embodied therewith, the computer usable program code being configured to:

maintain a respective condition indicator state for each condition indicator of a plurality of sets of condition indicators, each said set comprising a plurality of said condition indicators and associated with a respective hardware component of said computer system, each said condition indicator state being maintained independently of any other said condition indicator state of the respective said set, each said condition indicator having at least two possible states comprising an active state and an inactive state; and set a plurality of physical indicators to respective states, each said physical indicator comprising a physical device having an indicator state perceptible to a human user, each said physical indicator corresponding to a respective set of said plurality of sets of condition indicators, each said physical indicator having at least (N+1) possible states, wherein N is the number of condition indicators in the set of condition indicators with which the physical indicator is associated, the possible states comprising a state in which all condition indicators of the corresponding set are in an inactive state, and a respective state for each condition of the corresponding set being in an active state;

wherein said computer system is partitioned into a plurality of logical partitions, each said partition being allocated a respective subset of resources of said computer system;

wherein a respective set of virtual indicators is associated with each of at least some of said condition indicators, each virtual indicator being associated with a respective partition, and wherein a condition indicator state of a condition indicator with which a set of virtual indicators is associated is derived as a function of the states of the virtual indicators of the respective set of virtual indicators; and wherein respective processes executing in each partition can alter a state of a virtual indicator associated with the respective partition only if the virtual indicator belongs to a set of virtual indicators associated with a condition indicator which is a member of a set of condition indicators associated with a hardware component associated with the respective subset of resources of said computer system allocated to the respective partition.

7. The computer program product of claim 6, wherein each said physical indicator comprises a respective indicator light which can assume any of (N+1) possible states.

8. The computer program product of claim 6, wherein each said set of condition indicators comprises at least one respective fault indicator indicating a fault of the hardware component with which the respective set of condition indicators is associated.

9. The computer program product of claim 6, wherein each said set of condition indicators comprises at least one respective identify indicator indicating an identification of the hardware component with which the respective set of condition indicators is associated.

10. The computer program product of claim 6,
wherein respective processes executing in each partition can access only the virtual indicators associated with the respective partition and are unable to access the virtual indicators associated with other partitions or said condition indicators derived as a function of the states of the virtual indicators of respective sets of virtual indicators.

11. A computer system, comprising:

a plurality of hardware components, said hardware components including at least one processor and a memory which stores instructions executable on said at least one processor, each of at least some said hardware components corresponding to a respective physical indicator of a plurality of physical indicators, each said physical indicator comprising a physical device having an indicator state perceptible to a human user;

a physical indicator state manager which manages respective states of said physical indicators, said physical indicator state manager maintaining a respective condition indicator state for each condition indicator of a plurality of sets of condition indicators, each said set comprising a plurality of said condition indicators and corresponding to a respective said physical indicator, said physical indicator state manager maintaining each said condition indicator state independently of any other said condition indicator state of the respective said set, each said condition indicator having at least two possible states comprising an active state and an inactive state, said physical indicator state manager further setting each said physical indicator to a respective state, each said physical indicator having at least (N+1) possible states, wherein N is the number of condition indicators in the set of condition indicators with which the physical indicator is associated, the possible states comprising a state in which all condition indicators of the corresponding set are in an inactive state, and a respective state for each condition of the corresponding set being in an active state; and a partition manager for partitioning said computer system into a plurality of logical partitions, each said partition being allocated a respective subset of resources of said computer system;

wherein a respective set of virtual indicators is associated with each of at least some of said condition indicators, each virtual indicator being associated with a respective partition, and wherein a state of a condition indicator with which a set of virtual indicators is associated is derived as a function of the states of the virtual indicators of the respective set of virtual indicators; and wherein respective processes executing in each partition can alter a state of a virtual indicator associated with the respective partition only if the virtual indicator belongs to a set of virtual indicators associated with a condition indicator which is a member of a set of condition indicators associated with a hardware component associated with the respective subset of resources of said computer system allocated to the respective partition.

12. The computer system of claim 11, wherein said physical indicator state manager is embodied as a plurality of instructions executable on said at least one processor.

13. The computer system of claim 11, wherein each said physical indicator comprises a respective indicator light which can assume any of (N+1) possible states.

14. The computer system of claim 11, wherein each said set of condition indicators comprises at least one respective fault indicator indicating a fault of the hardware component with which the respective set of condition indicators is associated.

15. The computer system of claim 11, wherein each said set of condition indicators comprises at least one respective identify indicator indicating an identification of the hardware component with which the respective set of condition indicators is associated.

16. The computer system of claim 11,
wherein respective processes executing in each partition can access only the virtual indicators associated with the respective partition and are unable to access the virtual indicators associated with other partitions or said condition indicators derived as a function of the states of the virtual indicators of respective sets of virtual indicators.

* * * * *